United States Patent
Egnor et al.

(10) Patent No.: US 8,595,250 B1
(45) Date of Patent: *Nov. 26, 2013

(54) CATEGORY SUGGESTIONS RELATING TO A SEARCH

(75) Inventors: Daniel Egnor, New York, NY (US); Elizabeth Hamon Reid, Mamaroneck, NY (US)

(73) Assignee: Google Inc., Mountain View, CA (US)

( * ) Notice: Subject to any disclaimer, the term of this patent is extended or adjusted under 35 U.S.C. 154(b) by 188 days.

This patent is subject to a terminal disclaimer.

(21) Appl. No.: 13/233,107

(22) Filed: Sep. 15, 2011

Related U.S. Application Data

(63) Continuation of application No. 12/366,491, filed on Feb. 5, 2009, now Pat. No. 8,027,988, which is a continuation of application No. 11/024,975, filed on Dec. 30, 2004, now Pat. No. 7,523,099.

(51) Int. Cl.
*G06F 7/00* (2006.01)
*G06F 17/30* (2006.01)

(52) U.S. Cl.
USPC .......................................................... 707/758

(58) Field of Classification Search
None
See application file for complete search history.

(56) References Cited

U.S. PATENT DOCUMENTS

| | | |
|---|---|---|
| 6,285,999 B1 | 9/2001 | Page |
| 6,374,241 B1 | 4/2002 | Lamburt et al. |
| 6,397,228 B1 | 5/2002 | Lamburt et al. |
| 6,493,721 B1 | 12/2002 | Getchius et al. |
| 6,523,021 B1 | 2/2003 | Monberg et al. |
| 7,050,990 B1 | 5/2006 | Chu et al. |
| 7,523,099 B1 | 4/2009 | Egnor et al. |
| 8,027,988 B1 | 9/2011 | Egnor et al. |
| 2006/0122979 A1 | 6/2006 | Kapur et al. |

*Primary Examiner* — Uyen Le
(74) *Attorney, Agent, or Firm* — Harrity & Harrity, LLP

(57) ABSTRACT

A system determines categories for business listings identified in a list of search results and assigns scores to the categories. The system presents one or more high scoring ones of the categories as one or more category suggestions relating to the list of search results.

17 Claims, 9 Drawing Sheets

CATEGORY SUGGESTIONS RELATING TO A SEARCH

RELATED APPLICATIONS

This application is a continuation of U.S. application Ser. No. 12/366,491, filed Feb. 5, 2009, now U.S. Pat. No. 8,027,988, which is a continuation of U.S. application Ser. No. 11/024,975, filed Dec. 30, 2004, now U.S. Pat. No. 7,523,099, the disclosures of which are incorporated herein by reference.

BACKGROUND

1. Field of the Invention

Implementations described herein relate generally to information retrieval and, more particularly, to the presentation of category suggestions relating to a search.

2. Description of Related Art

Modern computer networks, and in particular, the Internet, have made large bodies of information widely and easily available. Internet search engines, for instance, index many millions of web documents that are linked to the Internet. A user connected to the Internet can enter a simple search query to quickly locate web documents relevant to the search query.

Web directories also exist to help users find information in which they are interested. The directories separate web documents into different hierarchical categories based on content. The directories often differ in the categories they create and the names assigned to the categories. The directories also often differ in the web documents that are included in their particular categories.

Finding information in a web directory can be difficult. A user may need to traverse several layers of categories—sometimes faced with the decision of selecting between two equally appealing categories.

SUMMARY

According to one aspect, a method may include determining categories for business listings identified in a list of search results, assigning scores to the categories, and presenting one or more high scoring ones of the categories as one or more category suggestions relating to the list of search results.

According to another aspect, a search system may include a search engine and a category suggestion engine. The search engine may receive a search query associated with a geographic area and identify a group of documents that are associated with locations in the geographic area based on the search query. The category suggestion engine may identify categories associated with documents in the group of documents, score the categories, and present one or more highest scoring ones of the categories as one or more category suggestions.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Overview

Figure 1:
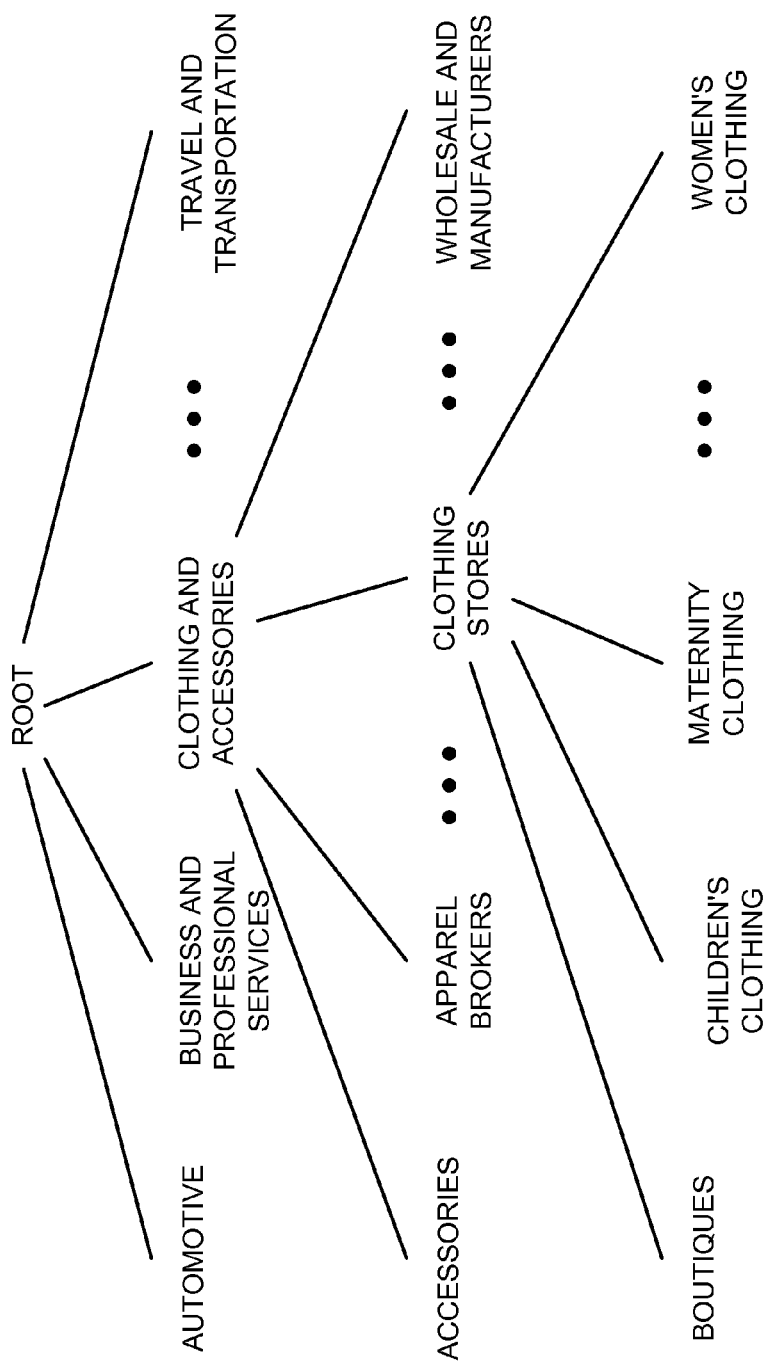
FIG. 1 is a diagram of a directory of business listings.

FIG. 1 is a diagram of a web directory of business listings. As shown in FIG. 1, the directory includes categories that form a hierarchy. The "clothing and accessories" category, for example, is shown as including several sub-categories (e.g., "accessories," "apparel brokers," "clothing stores," and "wholesale and manufacturers") and sub-sub-categories (e.g., "boutiques," "children's clothing," "maternity clothing," and "women's clothing"). Business listings may be assigned to the appropriate categories. For example, a business that sells maternity clothing may be assigned to the maternity clothing category.

Systems and methods consistent with the principles of the invention may use information regarding the categories to which documents are assigned to suggest categories that relate to a search. The categories may be used to further define the search or replace the search and present a user with results that are relevant to the user's interests.

A "document," as the term is used herein, is to be broadly interpreted to include any machine-readable and machine-storable work product. A document may include, for example, an e-mail, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Exemplary Network Configuration

Figure 2:
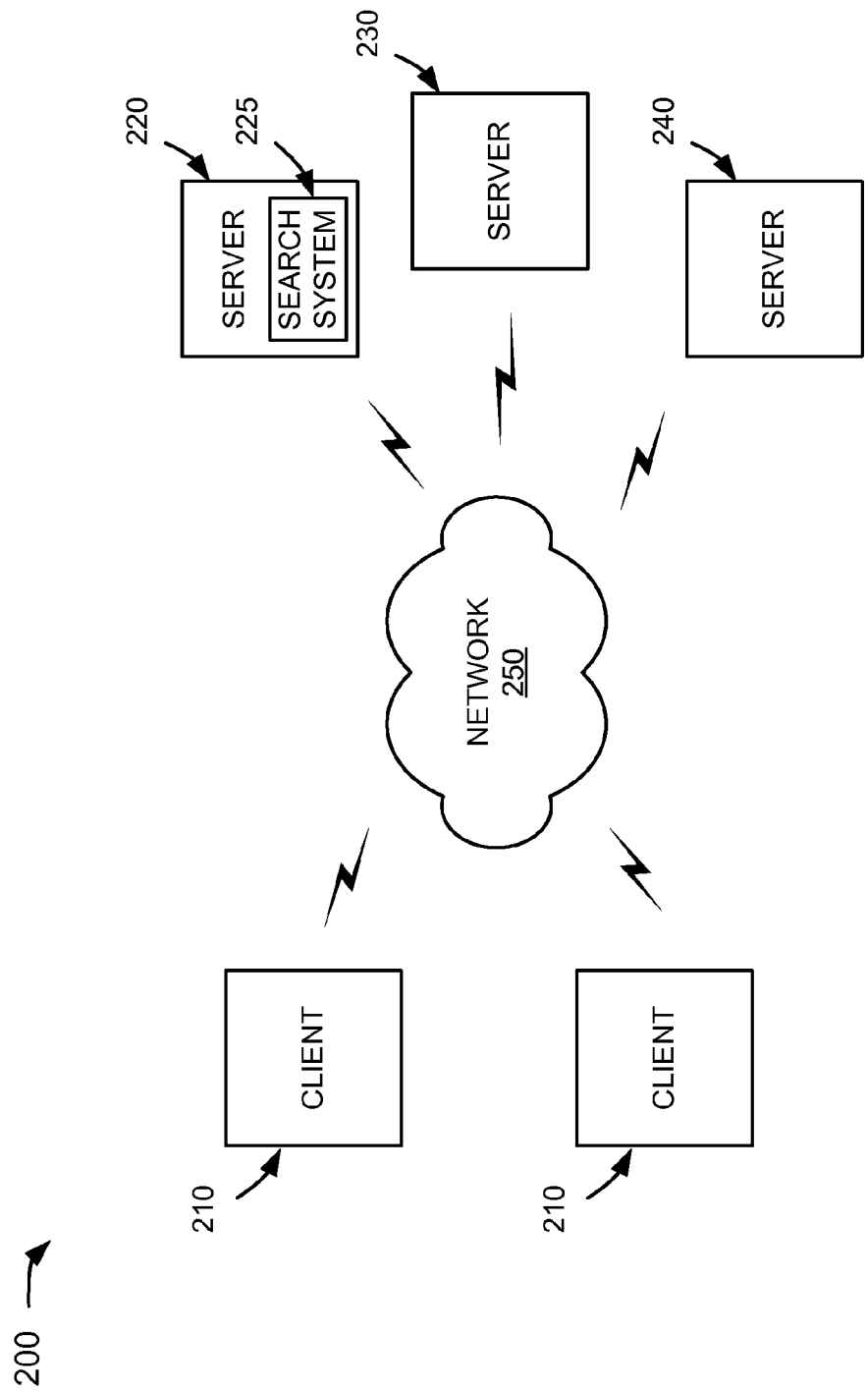
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform the functions of a server and a server may perform the functions of a client.

Clients 210 may include client entities. An entity may be defined as a device, such as a wireless telephone, a personal computer, a personal digital assistant (PDA), a lap top, or another type of computation or communication device, a thread or process running on one of these devices, and/or an object executable by one of these devices. Servers 220-240 may include server entities that gather, process, search, and/or maintain documents in a manner consistent with the principles of the invention.

In an implementation consistent with the principles of the invention, server 220 may include a search system 225 usable by clients 210. Server 220 may crawl a corpus of documents (e.g., web documents), index the documents, and store information associated with the documents in a repository of documents. Servers 230 and 240 may store or maintain documents that may be crawled or analyzed by server 120.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include a local area network (LAN), a wide area network (WAN), a telephone network, such as the Public Switched Telephone Network (PSTN), an intranet, the Internet, a memory device, or a combination of networks. Clients 210 and servers 220-240 may connect to network 250 via wired, wireless, and/or optical connections.

Exemplary Client/Server Architecture

Figure 3:
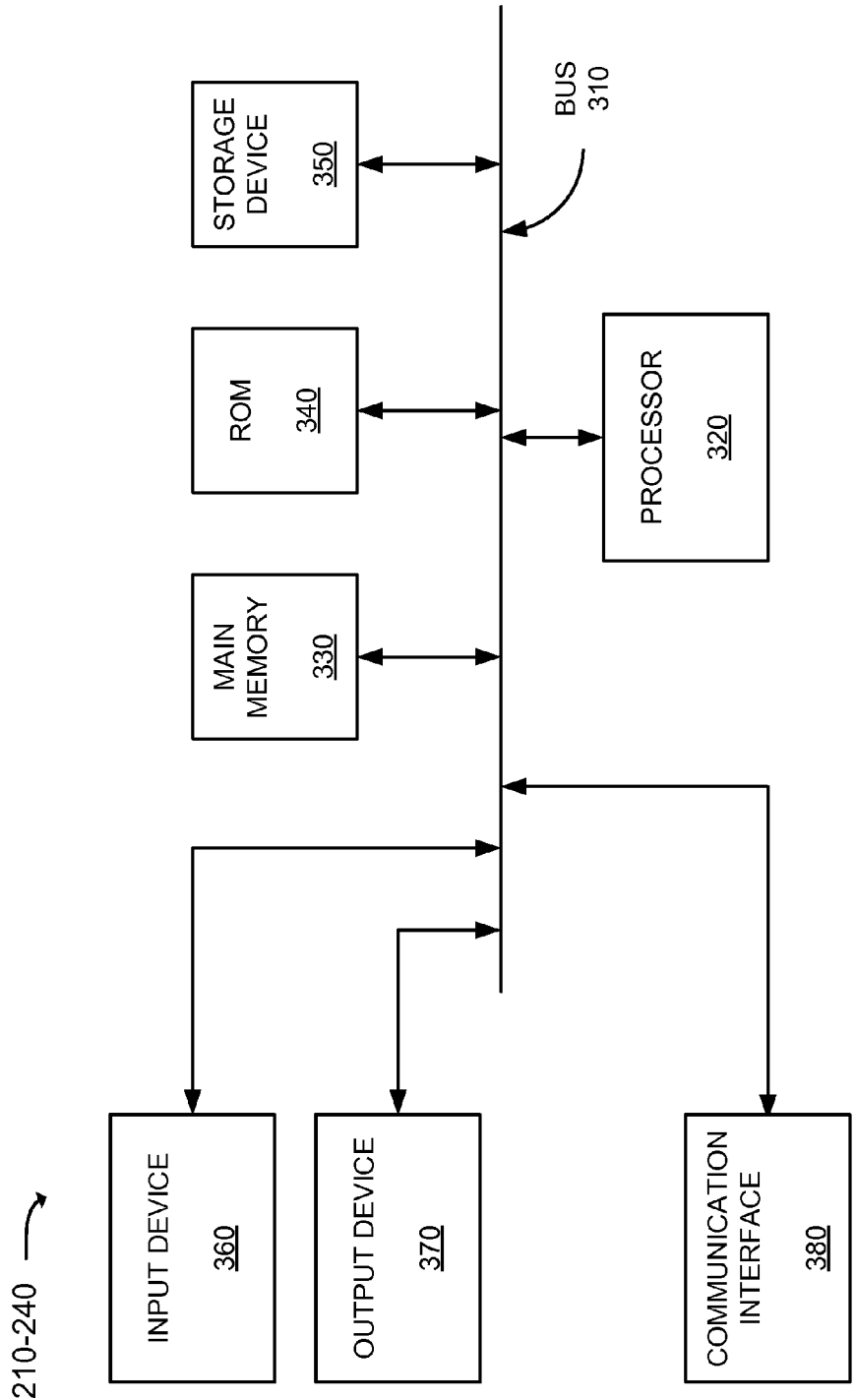
FIG. 3 is an exemplary diagram of a client or server of FIG. 2 according to an implementation consistent with the principles of the invention.

FIG. 3 is an exemplary diagram of a client or server entity (hereinafter called "client/server entity"), which may correspond to one or more of clients 210 and/or servers 220-240, according to an implementation consistent with the principles of the invention. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a conventional processor, microprocessor, or processing logic that interprets and executes instructions. Main memory 330 may include a random access memory (RAM) or another type of dynamic storage device that may store information and instructions for execution by processor 320. ROM 340 may include a conventional ROM device or another type of static storage device that may store static information and instructions for use by processor 320. Storage device 350 may include a magnetic and/or optical recording medium and its corresponding drive.

Input device 360 may include a conventional mechanism that permits an operator to input information to the client/server entity, such as a keyboard, a mouse, a pen, voice recognition and/or biometric mechanisms, etc. Output device 370 may include a conventional mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity, consistent with the principles of the invention, may perform certain document processing-related operations. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Search System

Figure 4:
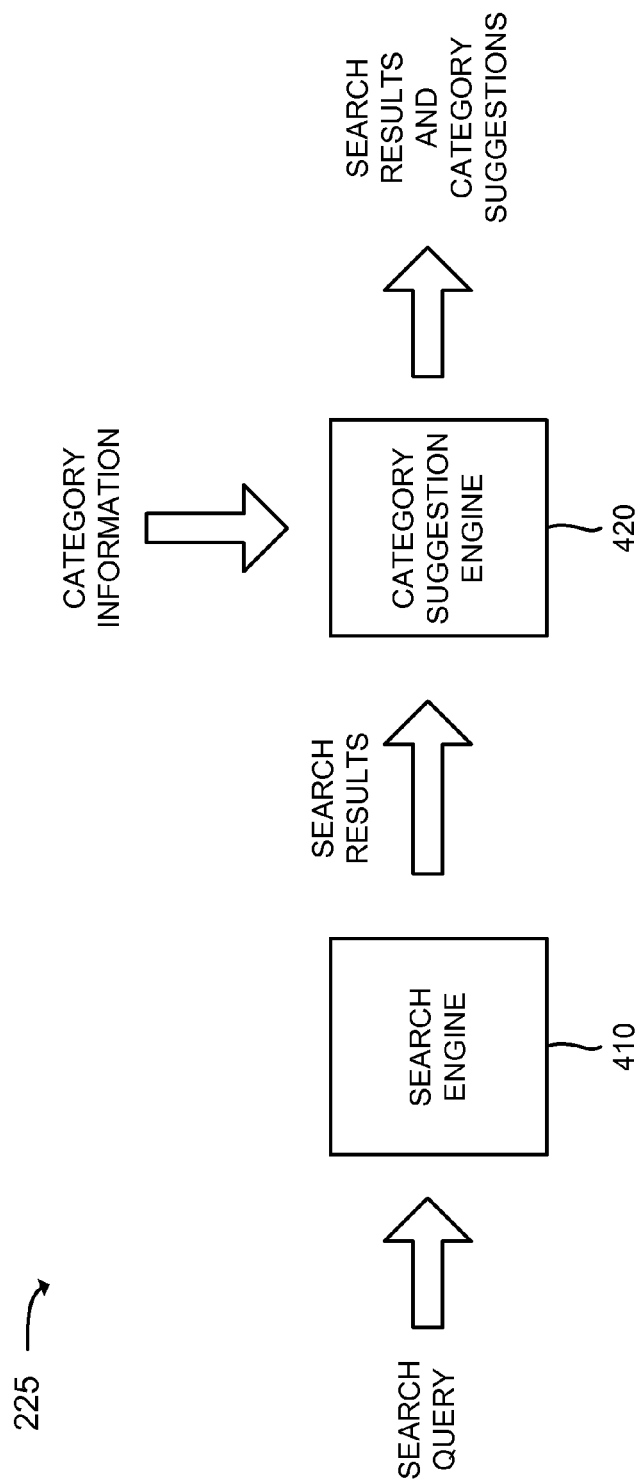
FIG. 4 is an exemplary diagram of a portion of the search system of FIG. 2 according to an implementation consistent with the principles of the invention.

FIG. 4 is an exemplary diagram of a portion of search system 225 according to an implementation consistent with the principles of the invention. The portion of search system 225 illustrated in FIG. 4 may include search engine 410 and category suggestion engine 420. While search engine 410 and category suggestion engine 420 are shown as separate engines, in practice, search engine 410 may include category suggestion engine 420.

Search engine 410 may include a traditional search engine that returns a ranked set of documents related to a user search query. Search engine 410 may include a general search engine, such as one based on documents from a large corpus, such as documents on the web, or a more specialized search engine, such as a local search engine.

In operation, search engine 410 may receive a user search query. Search engine 410 may identify a set of documents that match the search query by comparing the search terms in the query to documents in the document corpus. There are a number of known techniques that search engine 410 may use to identify documents related to a set of search terms. For example, when the set of search terms includes a single search term, search engine 410 might identify documents that contain the search term. When the set of search terms includes multiple search terms, search engine 410 might identify documents that contain the search terms as a phrase. Alternatively or additionally, search engine 410 might identify documents that contain the search terms, but not necessarily together. Alternatively or additionally, search engine 410 might identify documents that contain less than all of the search terms, or synonyms of the search terms. Yet other techniques for identifying relevant documents are known to those skilled in the art.

Search engine 410 might generate an information retrieval (IR) score for the identified documents. There are a number of known techniques that search engine 410 may use to generate an IR score for a document. For example, search engine 410 may generate an IR score based on the number of occurrences of the search terms in the document. Alternatively or additionally, search engine 410 may generate an IR score based on where the search terms occur within the document (e.g., title, content, etc.) or characteristics of the search terms (e.g., font, size, color, etc.). Alternatively or additionally, search engine 410 may weight a search term differently from another search term when multiple search terms are present. Alternatively or additionally, search engine 410 may consider the proximity of the search terms when multiple search terms are present. Yet other techniques for generating an IR score for a document are known to those skilled in the art.

Search engine 410 may sort the identified documents based on their IR scores and output them as a list of search results to category suggestion engine 420. In another implementation, search engine 410 may generate total scores for the documents based on a combination of their IR scores and link-based scores associated with the documents. Several techniques exist for determining the link-based score of a document. One such technique is described in U.S. Pat. No. 6,285,999, entitled "METHOD FOR NODE RANKING IN A LINKED DATABASE," the contents of which are incorporated by reference.

Category suggestion engine 420 may suggest one or more categories that relate to the search. In operation, category suggestion engine 420 may identify categories associated with the top N (e.g., 1000) documents in the list of search results. The categories may be obtained from a number of different category providers, such as yellow pages and web directories, or derived using an automatic text classification system. A category associated with a document may be pre-stored with the document in a database associated with server 220. In this case, category suggestion engine 420 may identify the category by looking it up in the database. A document may have one or more associated categories.

Category suggestion engine 420 may score the categories based on the scores of the associated documents in the list of search results. For example, a score assigned to a category associated with a document with a higher score may be higher than a score assigned to a category associated with a document with a lower score. In some cases, it may be possible for the categories associated with two different documents to be assigned the same score, such as when the two documents have similar scores.

Category suggestion engine 420 may combine (e.g., add) the scores assigned to the categories. For example, a category may be associated with a number of documents in the list of search results. Category suggestion engine 420 may add the scores for the category to identify its final score. Category suggestion engine 420 may then identify the highest scoring one or more categories and present them as suggestions for the search with the list of search results.

According to another implementation, category suggestion engine 420 may count the number of occurrences of each of the categories. Category suggestion engine 420 may then assign a final score to the categories based on their number of occurrences. Category suggestion engine 420 may then identify the highest scoring one or more categories and present them as suggestions for the search with the list of search results.

Sometimes the categories are derived from a number of different category providers that may use different naming schemes. For example, a category for pizza restaurants may be named "pizza restaurant" under one naming scheme and "restaurant: pizza" under another naming scheme. In one implementation, category suggestion engine 420 may consider similar category names as the same category for scoring purposes. Also, category suggestion engine 420 may use the naming scheme associated with the highest scoring category when presenting category suggestions. In another implementation, category suggestion engine 420 may use a different technique.

Exemplary Processing

Figure 5:
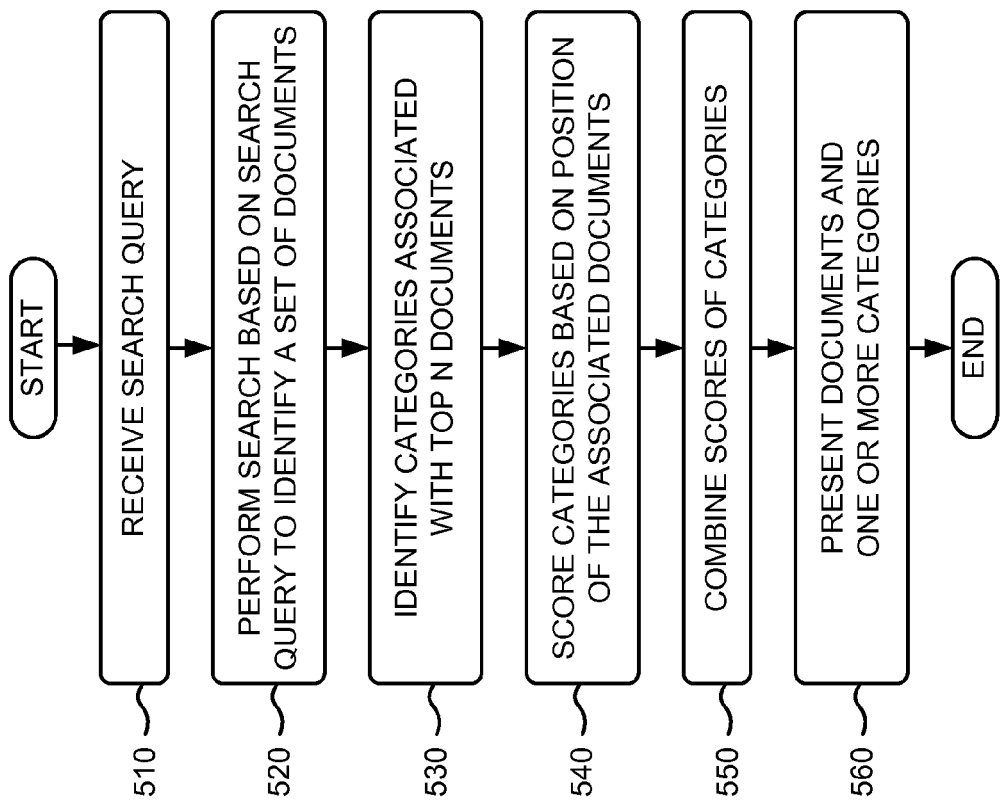
FIG. 5 is a flowchart of exemplary processing for presenting category suggestions relating to a search according to an implementation consistent with the principles of the invention.

FIG. 5 is a flowchart of exemplary processing for presenting category suggestions relating to a search according to an implementation consistent with the principles of the invention. Processing may begin with server 220 receiving a search query (block 510). In one implementation, a user may use a web browser associated with a client 210 to provide the search query to server 220.

A search may be performed to identify a set of documents based on the search query (block 520). For example, the term(s) of the search query may be compared to the text of documents in the document corpus. Documents related to the search query may be identified and scored in a manner similar to that described above.

Categories associated with the top N (e.g., 1000) documents in the list of search results may be identified (block 530). In one implementation, the categories may be identified by looking up category information in a database.

The categories may be scored based on the positions of the associated documents in the list of search results (block 540). For example, the category scores may, in one implementation, be based on the scores (which determine the position) of the associated documents in the list of search results. The scores for each of the categories may then be combined (e.g., added) to identify a final score assigned to the category (block 550). In another implementation, final scores may be assigned to the categories based on a count of the number of occurrences of the categories.

The one or more highest scoring categories may be presented as suggestions for the search along with the list of search results (block 560). The category suggestions may assist the user in refining the search query to find documents in which the user is interested. For example, if the user selects one of the category suggestions, a refined search may be performed to identify documents in the list of search results that are assigned to the category corresponding to the selected category suggestion. Alternatively, the documents in the list of search results may be replaced with documents associated with the selected category suggestion.

Example

Figure 6:
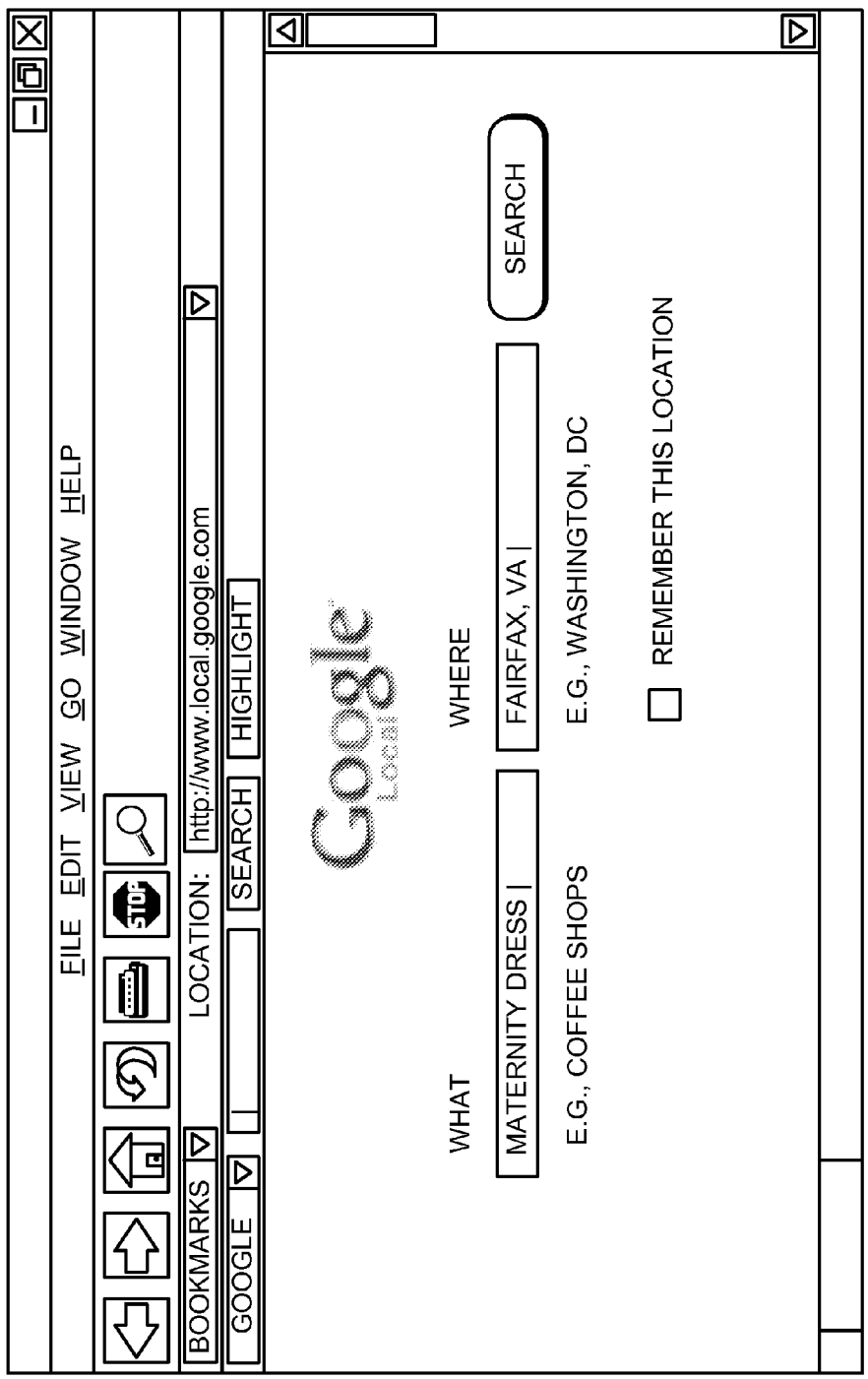
FIGS. 6-9 are exemplary diagrams of a local search user interface that may be presented to a user according to an implementation consistent with the principles of the invention.

FIGS. 6-9 are exemplary diagrams of a local search user interface that may be presented to a user according to an implementation consistent with the principles of the invention. As shown in FIG. 6, a user interface may be presented relating to local searching. The local search user interface may permit a user to search for business listings in a particular location. To assist the user in searching, the user interface may provide a "What" field and a "Where" field. For example, the user may enter the name of a business (e.g., "Pizza Hut") or a type of business (e.g., pizza restaurant) in the "What" field. The user may enter the name of a location (e.g., Albany, N.Y.) in the "Where" field. Assume for this example, that the user entered "maternity dress" in the What field and "Fairfax, Va." in the Where field of the user interface.

A server associated with the local search user interface, such as server 220, may perform a search based on the search terms "maternity dress" and "Fairfax Va." to identify documents associated with businesses relating to the search terms "maternity dress" in the "Fairfax, Va." location and include the identified documents in a list of search results. As described above, categories may be identified for the documents, the categories may be scored, and the one or more highest scoring categories may be determined.

Figure 7:
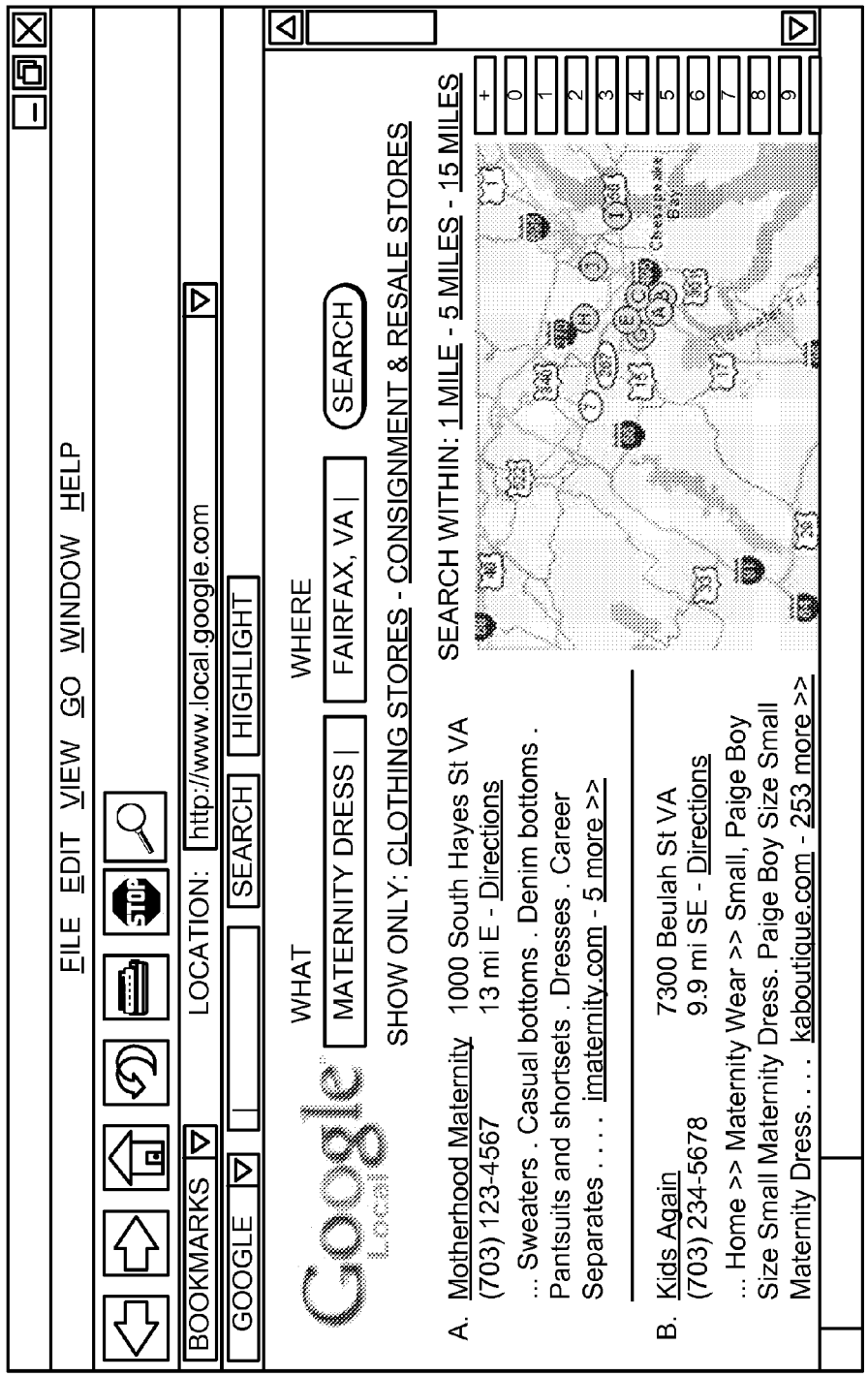

As shown in FIG. 7, the local search user interface may present the list of search results. For each document in the list of the search results (or for some set of the search results), the user interface may provide address information for the business associated with the document, a telephone number for the business, a link to more information associated with the business, a link to directions to the business, and/or a link to one or more documents that refer to the business. The user interface may also provide a map of the area covered by the search. The map may optionally include pointers to businesses associated with the list of search results (or some set of the search results).

As further shown in FIG. 7, the local search user interface may present one or more category suggestions relating to the search. As explained above, the category suggestions may correspond to the one or more highest scoring categories. In the example of FIG. 7, the category suggestions include a "Clothing Stores" category and a "Consignment & Resale Stores" category.

Assume that the user selected the clothing stores category. In this case, the server may refine the search to identify documents associated with businesses relating to the search terms "maternity dress" in the "Fairfax, Va." location that are assigned to the clothing stores category and include the identified documents in a modified list of search results. Alternatively, the server may replace the user's search query with the selected category. In this case, the server may provide documents relating to the selected category as a modified list of search results.

Figure 8:
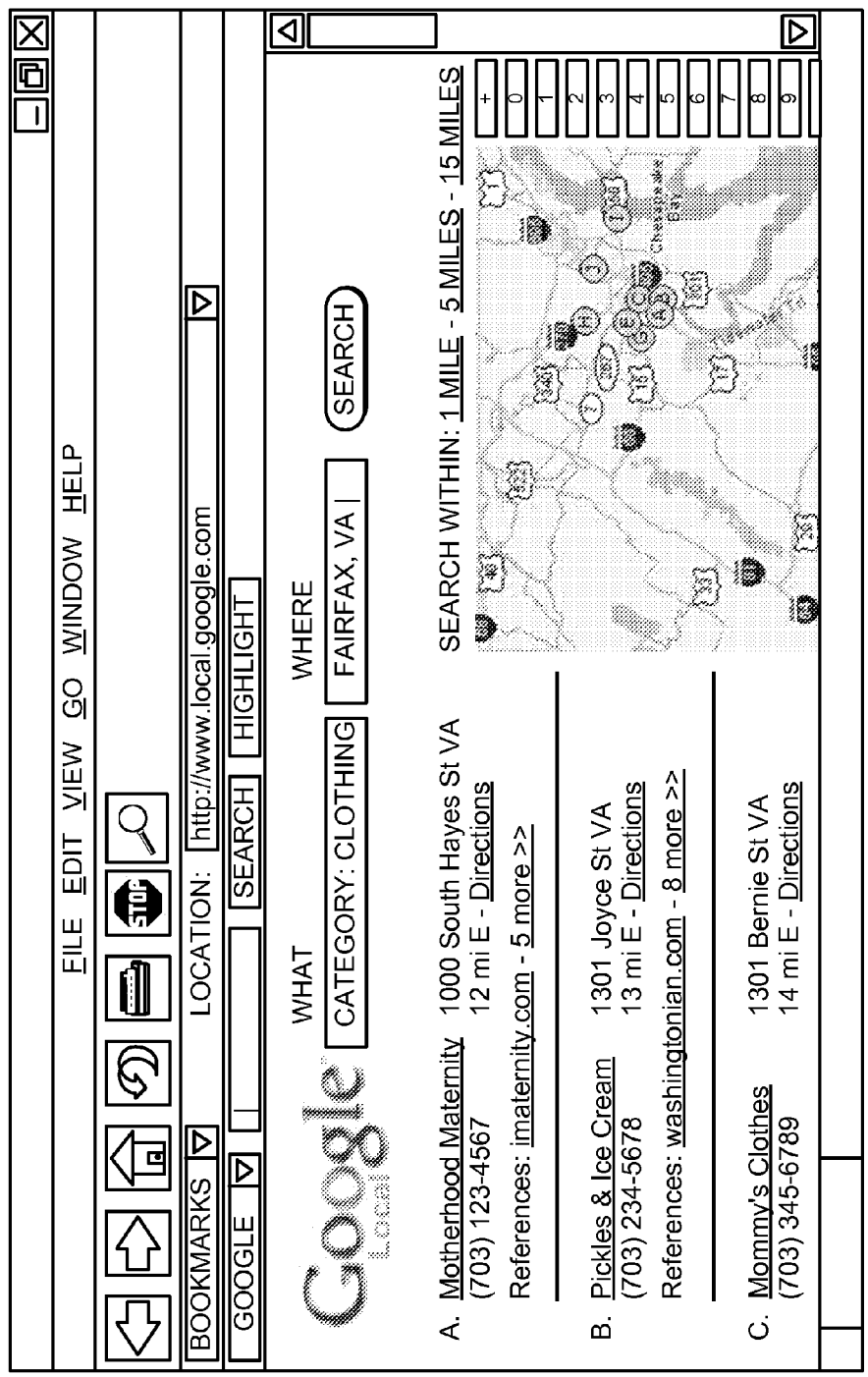

As shown in FIG. 8, the local search user interface may present the modified list of search results. For each document in the modified list of the search results (or for some set of the search results), the user interface may provide address information for the business associated with the document, a telephone number for the business, a link to more information associated with the business, a link to directions to the business, and/or a link to one or more other web documents that refer to the business. The user interface may also provide a map of the area covered by the search. The map may optionally include pointers to businesses associated with the list of search results (or some set of the search results).

Assume that the user selected the consignment & resale stores category. In this case, the server may refine the search to identify documents associated with businesses relating to the search terms "maternity dress" in the "Fairfax, Va." location that are assigned to the consignment & resale stores category and include the identified documents in a modified list of search results. Alternatively, the server may replace the user's search query with the selected category. In this case, the server may provide documents relating to the selected category as a modified list of search results.

Figure 9:
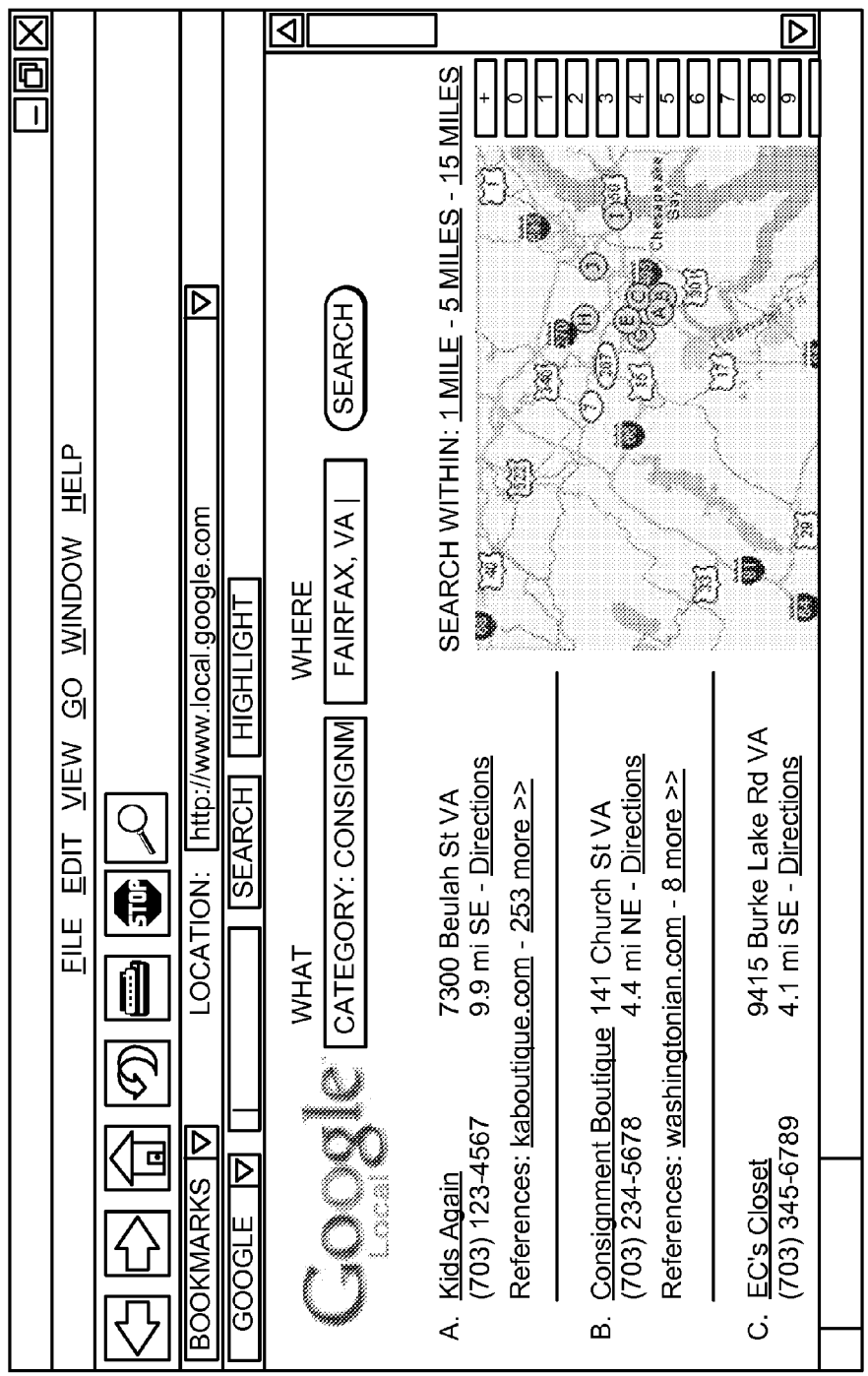

As shown in FIG. 9, the local search user interface may present the modified list of search results. For each document in the modified list of the search results (or for some set of the search results), the user interface may provide address information for the business associated with the document, a telephone number for the business, a link to more information associated with the business, a link to directions to the business, and/or a link to one or more other web documents that refer to the business. The user interface may also provide a map of the area covered by the search. The map may optionally include pointers to businesses associated with the list of search results (or some set of the search results).

CONCLUSION

Systems and methods consistent with the principles of the invention may perform a search to identify documents based on a search query and use information regarding the categories to which the documents are assigned to suggest categories that relate to the search. The categories may be used to further define or replace the search and present a user with results that are relevant to the user's interests.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 5, the order of the acts may be modified in other implementations consistent with the principles of the invention. Further, non-dependent acts may be performed in parallel.

Also, exemplary user interfaces have been described with respect to FIGS. 6-9. In other implementations consistent with the principles of the invention, the user interfaces may include more, fewer, or different pieces of information.

The category suggestions have been described as relating to the search. One skilled in the are would readily recognize that the category suggestions also relate to interests of the user who provided the search query.

Further, certain portions of the invention have been described as an "engine" that performs one or more functions. An engine may include hardware, such as an application specific integrated circuit or a field programmable gate array, software, or a combination of hardware and software.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving a search query from a client device;
        selecting, by one or more devices, a plurality of documents that are responsive to the search query, each of the plurality of documents having a corresponding information retrieval score;
        identifying, by the one or more devices, a plurality of categories based on the plurality of documents;
        determining, by the one or more devices, a score for each of the plurality of categories, wherein the score for each category is based on at least one of a number of the plurality of documents associated with each category or the information retrieval score of at least one document that is associated with each category;
        selecting, by the one or more devices, one or more recommended categories based on the respective scores determined for each of the plurality of the categories; and
        providing, by the one or more devices, information regarding the plurality of documents and the one or more recommended categories to the client device.

2. The method of claim 1, where the plurality of documents includes a plurality of web documents.

3. The method of claim 1, where identifying the plurality of categories includes identifying the plurality of categories from information in a data structure that relates documents to categories.

4. The method of claim 1, where the determining a score for each of the plurality of categories includes:
identifying a subset of the plurality of documents that are responsive to the search query and that are associated with each category, and
combining the information retrieval scores of the subset of the plurality of documents to generate the score for each category.

5. The method of claim 1, further comprising:
receiving a selection of a particular category of the one or more recommended categories; and
providing to the client device information regarding only those documents that are associated with the particular category.

6. The method of claim 1, further comprising:
receiving a selection of a particular category of the one or more recommended categories;
generating a list of documents that are associated with the particular category; and
providing the list of documents to the client device.

7. A non-transitory computer-readable medium comprising:
one or more instructions, which when executed by one or more processors, cause the one or more processors to:
receive a search query from a client device;
select a plurality of documents that are responsive to the search query, each of the plurality of documents having a corresponding information retrieval score;
identify a plurality of categories based on categories associated with the plurality of documents;
determine a score for each of the plurality of categories, wherein the score for each category is determined based on the information retrieval score of at least one document that is associated with each category;
select one or more categories from the plurality of categories as one or more recommended categories based on the respective scores determined for each of the plurality of categories; and
provide information regarding the plurality of documents and the one or more recommended categories to the client device.

8. The non-transitory computer-readable medium of claim 7, where the plurality of documents includes a plurality of web documents.

9. The non-transitory computer-readable medium of claim 7, where the one or more instructions to identify the plurality of categories include one or more instructions, which when executed by the one or more processors, cause the one or more processors to:
determine the plurality of categories from information in a data structure that relates documents to categories.

10. The non-transitory computer-readable medium of claim 7, where the one or more instructions to determine a score for each of the plurality of categories include:
one or more instructions, which when executed by the one or more processors, cause the one or more processors to:
identify a subset of the plurality of documents that are responsive to the search query that are associated with each category, and
combine the information retrieval scores of the subset of the plurality of documents to generate the score for each category.

11. The non-transitory computer-readable medium of claim 7, where the instructions further comprise:
one or more instructions, which when executed by the one or more processors, cause the one or more processors to:
receive, from the client device, a selection of a particular category of the one or more recommended categories; and
provide to the client device information regarding only those documents that are associated with the particular category.

12. The non-transitory computer-readable medium of claim 7, where the instructions further comprise:
one or more instructions, which when executed by the one or more processors, cause the one or more processors to:
receive, from the client device, a selection of a particular category of the one or more recommended categories;
generate, to the received selection, a list of documents, is associated with the particular category; and
provide the list of documents to the client device.

13. A non-transitory computer-readable medium comprising:
one or more instructions, which when executed by one or more processors, cause the one or more processors to:
receive a search query from a client device;
select a plurality of documents that are responsive to the search query;
identify a plurality of categories based on categories associated with the plurality of documents;
determine a score for each of the plurality of categories based on a number of the plurality of documents associated with each category;
select one or more categories from the plurality of categories as one or more recommended categories based on the scores determined for each of the plurality of categories; and
provide information regarding the plurality of documents and the one or more recommended categories to the client device.

14. The non-transitory computer-readable medium of claim 13, where the plurality of documents includes a plurality of web documents.

15. The non-transitory computer-readable medium of claim 13, where the one or more instructions to identify the plurality of categories include one or more instructions, which when executed by the one or more processors, cause the one or more processors to:
determine the plurality of categories from information in a data structure that relates documents to categories.

16. The non-transitory computer-readable medium of claim 13, where the one or more instructions further comprise instructions, which when executed by the one or more processors, cause the one or more processors to:
receive, from the client device, a selection of a particular category of the one or more recommended categories; and
provide, to the client device information regarding only those documents that are associated with the particular category.

17. The non-transitory computer-readable medium of claim 13, where the instructions further comprise:
one or more instructions, which when executed by the one or more processors, cause the one or more processors to:
receive, from the client device, a selection of a particular category of the one or more recommended categories;
generate a list of documents, associated with the particular category; and
provide the list of documents to the client device.

* * * * *